United States Patent [19]
Hoyt et al.

[11] Patent Number: 5,584,001
[45] Date of Patent: Dec. 10, 1996

[54] BRANCH TARGET BUFFER FOR DYNAMICALLY PREDICTING BRANCH INSTRUCTION OUTCOMES USING A PREDICTED BRANCH HISTORY

[75] Inventors: Bradley D. Hoyt; Glenn J. Hinton, both of Portland; Andrew F. Glew, Hillsboro; Subramanian Natarajan, Portland, all of Oreg.

[73] Assignee: Intel Corporation, Santa Clara, Calif.

[21] Appl. No.: 509,331

[22] Filed: Jul. 31, 1995

Related U.S. Application Data

[63] Continuation of Ser. No. 62,012, May 14, 1993, abandoned.

[51] Int. Cl.$^6$ ....................................................... G06F 9/00
[52] U.S. Cl. ................ 395/585; 364/261.3; 364/DIG. 1; 364/DIG. 2; 395/587
[58] Field of Search ......................... 395/375; 364/261.3, 364/261.4, 261.5

[56] References Cited

U.S. PATENT DOCUMENTS

| | | | |
|---|---|---|---|
| 4,477,872 | 10/1984 | Losq et al. | 395/375 |
| 4,679,141 | 7/1987 | Pomerene et al. | 395/375 |
| 4,991,080 | 2/1991 | Emma et al. | 395/375 |
| 5,142,634 | 8/1992 | Fite et al. | 395/375 |
| 5,168,557 | 12/1992 | Shibuya | 395/375 |
| 5,210,831 | 5/1993 | Emma et al. | 395/375 |
| 5,226,130 | 7/1993 | Fauok et al. | 395/375 |
| 5,265,213 | 11/1993 | Weiser et al. | 395/375 |
| 5,442,756 | 8/1995 | Grochowski et al. | 395/375 |
| 5,488,730 | 1/1996 | Brown, III et al. | 395/800 |

OTHER PUBLICATIONS

Superstar Microprocessor Design; author: Mike Johnson; Published by Prentice Hall, Inc., New Jersey; 1991; pp. 57–85 and 261–272.

Improving the Accuracy of Dynamic Branch Prediction Using Branch Correlation, Pan et al. pp. 76–84.
Future Trends in Microprocessors out of Order Execution, Speculative Branching and their CISC Performance Potential Peleg et al, IEEE publication pp. 263–266.
IEEE Micro, Published Jun., 1991, pp. 10–13, and 63–73, Authors: Val Popescu, et al., Entitled: The Metaflow Architecture.
"Alternative Implementations of Two–Level Adaptive Branch Prediction", by Tse–Yu Yeh & Yale N. Patt (pp. 124–134) published 1992 by ACM.
"Branch Prediction Strategies and Branch Target Buffer Design", by Johnny K. F. Lee & Alan J. Smith (pp. 6–22) published 1984 by Computer.
"Improving the Accuracy of Dynamic Branch Prediction Using Branch Correlation", by Shien–Tai Pan, Kimming So & Joseph T. Rahmeh (pp. 76–84) published 1992 by ACM.
"Two–Level Adaptive Training Branch Prediction", by Tse–Yu Yeh & Yale N. Patt (pp. 51–61) published 1991 by ACM.

*Primary Examiner*—William M. Treat
*Assistant Examiner*—Zarni Maung
*Attorney, Agent, or Firm*—Blakely, Sokoloff, Taylor & Zafman

[57] ABSTRACT

A branch prediction mechanism that maintains both speculative history and actual history for each branch instruction in a branch target buffer. The actual branch history contains the branch history for fully resolved occurrences of the branch instruction. The speculative branch history contains the actual history plus the "history" of recent branch predictions for the branch. If the speculative branch history contains any recent predictions, then a speculation bit is set. When the speculation bit is set, this indicates that there is speculative history for a branch. Therefore, when the speculation bit is set the speculative history is used to make branch predictions. If a misprediction is made for the branch, the speculation bit is cleared since the speculative history contains inaccurate branch history.

42 Claims, 8 Drawing Sheets

| Label | Operation | Parameters |
|-------|-----------|------------|
| Begin | Load | R1, #3 |
| Loop | Add | R2, R1 |
|  | Decrement | R1 |
| Go back | Branch, if not zero | Loop |
| Done | Store | R2, Memory |

Figure 2b - (Prior Art)

Pipe Stage

| Clock Cycle | Fetch 1 — 1 | Fetch 2 — 2 | ILD/Rotate — 3 | Decode 1 — 4 | Decode 2 — 5 | Reg.Rename — 6 | Scheduling — 7 | Dispatch — 8 | Execute — 9 | Retire 1 — 10 | Retire 2 — 11 |
|---|---|---|---|---|---|---|---|---|---|---|---|
| N | Load | | | | | | | | | | |
| N+1 | Add | Load | | | | | | | | | |
| N+2 | Decrement | Add | Load | | | | | | | | |
| N+3 | Branch | Decrement | Add | Load | | | | | | | |
| N+4 | Add | Branch | Decrement | Add | Load | | | | | | |
| N+5 | Decrement | Add | Branch | Decrement | Add | Load | | | | | |
| N+6 | Branch | Decrement | Add | Branch | Decrement | Add | Load | | | | |
| N+7 | Add | Branch | Decrement | Add | Branch | Decrement | Add | Load | | | |
| N+8 | Decrement | Add | Branch | Decrement | Add | Branch | Decrement | Add | Load | | |
| N+9 | Branch | Decrement | Add | Branch | Decrement | Add | Branch | Decrement | Add | Load | |
| N+10 | ~~Add~~ | Branch | Decrement | Add | Branch | Decrement | Add | Branch | Decrement | Add | Load |

Pipe Stage

| Clock Cycle | Fetch 1 1 | Fetch 2 2 | ILD/Rotate 3 | Decode 1 4 | Decode 2 5 | Reg.Rename 6 | Scheduling 7 | Dispatch 8 | Execute 9 | Retire 1 10 | Retire 2 11 |
|---|---|---|---|---|---|---|---|---|---|---|---|
| N | Load | | | | | | | | | | |
| N+1 | Add | Load | | | | | | | | | |
| N+2 | Decrement | Add | Load | | | | | | | | |
| N+3 | Branch | Decrement | Add | Load | | | | | | | |
| N+4 | Add | Branch | Decrement | Add | Load | | | | | | |
| N+5 | Decrement | Add | Branch | Decrement | Add | Load | | | | | |
| N+6 | Branch | Decrement | Add | Branch | Decrement | Add | Load | | | | |
| N+7 | Add | Branch | Decrement | Add | Branch | Decrement | Add | Load | | | |
| N+8 | Decrement | Add | Branch | Decrement | Add | Branch | Decrement | Add | Load | | |
| N+9 | Branch | Decrement | Add | Branch | Decrement | Add | Branch | Decrement | Add | Load | |
| N+10 | Store | Branch | Decrement | Add | Branch | Decrement | Add | Branch | Decrement | Add | Load |
| N+11 | | Store | Branch | Decrement | Add | Branch | Decrement | Add | Branch | Decrement | Add |

BRANCH TARGET BUFFER FOR DYNAMICALLY PREDICTING BRANCH INSTRUCTION OUTCOMES USING A PREDICTED BRANCH HISTORY

This is a continuation of application Ser. No. 08/062,012, filed May 14, 1993, now abandoned.

BACKGROUND OF THE INVENTION

1. Field of the Invention

This invention relates to branch prediction mechanisms for microprocessors. More specifically to a branch prediction mechanism that stores "speculative history" when a branch prediction is made such that branch history is immediately available for branch instructions within small loops.

2. Art Background

Early microprocessors generally processed instructions one at a time. Each instruction was processed using four sequential stages: instruction fetch, instruction decode, execute, and result writeback. Within such microprocessors, different dedicated logic blocks performed each different processing stage. Each logic block waits until all the previous logic blocks complete operations before beginning its operation.

To improve efficiency, microprocessor designers overlapped the operations of the fetch, decode, execute, and writeback stages such that the microprocessor operated on several instructions simultaneously. In operation, the fetch, decode, execute, and writeback stages concurrently process different instructions. At each clock tick the results of each processing stage are passed to the following processing stage. Microprocessors that use the technique of overlapping the fetch, decode, execute, and writeback stages are known as "pipelined" microprocessors.

In order for a pipelined microprocessor to operate efficiently, an instruction fetch unit at the head of the pipeline must continually provide the pipeline with a stream of instructions. However, conditional branch instructions within an instruction stream prevent an instruction fetch unit at the head of a pipeline from fetching the correct instructions until the condition is resolved. Since the condition will not be resolved until further down the pipeline, the instruction fetch unit cannot fetch the proper instructions.

To alleviate this problem, many pipelined microprocessors use branch prediction mechanisms that predict the outcome of branch instructions, and then fetch subsequent instructions according to the branch prediction. For example, Yeh & Patt introduced a highly accurate two-level branch prediction mechanism. (See Tse Yu Yeh and Yale N. Patt, *Two-Level Adaptive Branch Prediction.*, The 24th ACM/IEEE International Symposium and Workshop on Microarchitecture, November 1991, pp. 51–61) When the branch prediction mechanism mispredicts a branch, the instructions which should not have been fetched are flushed out of the instruction pipeline.

Most branch prediction mechanisms, such as the two-level branch prediction mechanism disclosed by Yeh & Patt, operate by dynamically maintaining the outcome history of branches. The branch predictions are then made based upon the stored branch history.

When a small loop is executing in a deeply pipelined processor, several occurrences of the same branch instruction can be in the instruction pipeline at the same time. In such a situation, the earlier branches are unresolved. Therefore, no history for the earlier branches will be available to the branch prediction mechanism. Since the branch history for the branch instructions farther down the pipeline is not available to the later occurrences of the branch instruction, the branch predictions for the later branch instruction will be made using outdated history. Therefore, in a deeply pipelined processor, a branch prediction mechanism that makes predictions based upon branch history often mispredicts branches in small loops.

SUMMARY OF THE INVENTION

It is therefore an object of the present invention to provide a branch prediction mechanism that makes predictions based upon "speculative history" of branches that are still in the instruction pipeline. The speculative branch history consists of the previous branch history plus recent branch predictions for the branch.

This and other objectives are accomplished by the branch prediction mechanism of the present invention that maintains a speculative history and an actual history for each branch instruction in a branch target buffer. The actual branch history contains the branch history for fully resolved occurrences of the branch instruction. The speculative branch history contains the actual history plus the "history" of recent branch predictions for the branch. If the speculative branch history contains any recent predictions, then a speculation bit is set. When the speculation bit is set, this indicates that there is speculative history for a branch. Therefore, when the speculation bit is set the speculative history is used to make branch predictions. If a misprediction is made for the branch, the speculation bit is cleared since the speculative history contains inaccurate branch history.

BRIEF DESCRIPTION OF THE DRAWINGS

The objects, features and advantages of the present invention will be apparent to one skilled in the art, in view of the following detailed description in which.

NOTATION AND NOMENCLATURE

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, selected, chosen, modified, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The algorithms presented herein are not inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below. Machines which may perform the functions of the present invention include those manufactured by the Assignee, Intel Corporation, as well as other manufacturers of computer systems.

DETAILED DESCRIPTION OF THE INVENTION

A branch prediction mechanism that makes branch predictions based upon speculative branch history is disclosed. In the following description, for purposes of explanation, specific nomenclature is set forth to provide a thorough understanding of the present invention. However, it will be apparent to one skilled in the art that these specific details are not required in order to practice the present invention. In other instances, well known circuits and devices are shown in block diagram form in order not to obscure the present invention unnecessarily.

Branch Prediction In Deeply Pipelined Processors

Figure 1:
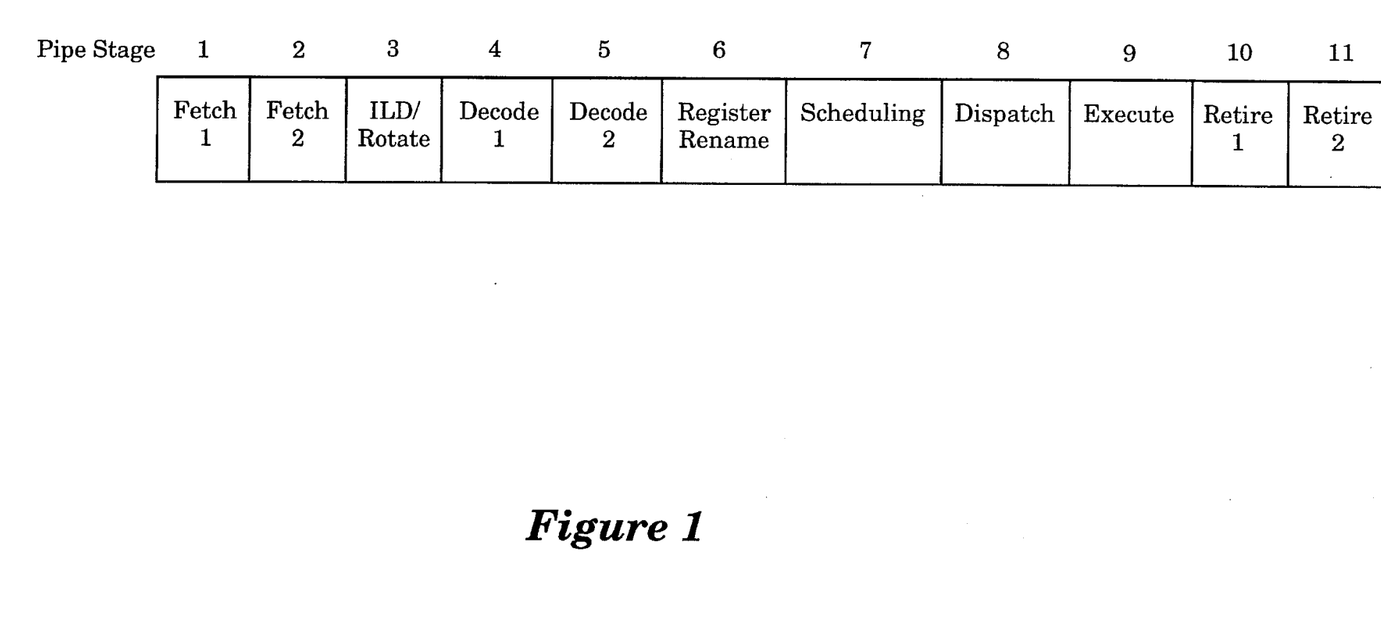
FIG. 1 is a block diagram of a deep pipeline for processing instructions.

In a deeply pipelined processor, the major stages of a pipelined processor such as fetch, decode, and execute, are divided into several substages such that each major stage is pipelined. This results in a long instruction pipeline. For example, FIG. 1 illustrates a set of pipeline stages a deeply pipelined processor. In the instruction pipeline of FIG. 1, there are 11 pipeline stages.

Located at the head of the instruction pipeline illustrated in FIG. 1 are two instruction fetch substages. (Fetch 1 and Fetch 2) The two instruction fetch substages are responsible for continually fetching new instructions for the instruction pipeline. Unconditional branch instructions within the instruction stream prevent the fetch substages from simply fetching sequential instructions. Furthermore, conditional branch instructions in the instruction stream prevent the fetch substages from simply fetching instructions along a predefined path. The instruction fetch substages must therefore fetch future instructions without knowing exactly where the program is going.

To fetch future instructions, the fetch substages at the head of an instruction pipeline are implemented with a branch prediction mechanism. The branch prediction mechanism predicts where branch instructions exist in the instruction stream and the outcome of these branch instructions. The instruction fetch unit then fetches the stream of instructions as predicted by the branch prediction mechanism.

Most branch prediction mechanisms predict the outcome of a branch instruction based upon the outcome of prior occurrences of the branch instruction. Each time a branch instruction is resolved, the branch prediction mechanism stores the branch outcome in a branch history buffer. Upon subsequent occurrences of the branch instruction, the branch prediction mechanism makes a branch prediction based upon the collected branch history. Very high branch prediction rates have been achieved with such branch prediction mechanisms. For example, the Yeh & Patt two-level adaptive branch prediction mechanism achieves prediction rates with over 97% accuracy. (See Tse Yu Yeh and Yale N. Patt, *Two-Level Adaptive Branch Prediction*, The 24th ACM/IEEE International Symposium and Workshop on Microarchitecture, November 1991, page 60)

Deeply pipelined processors can complicate the branch prediction process. Specifically, in deeply pipelined processors the branch instructions in a short program loop are often mispredicted by branch prediction mechanisms that use branch history to make predictions. An illustration of this problem is presented with reference to FIGS. 1, 2a and 2b.

Figure 2A:
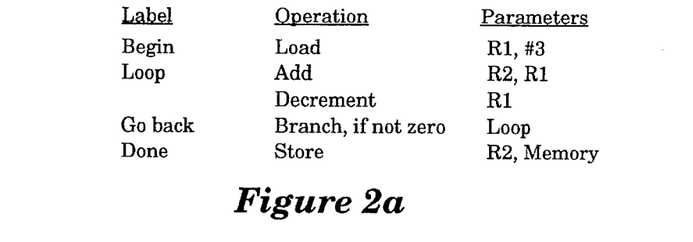
FIG. 2a is a simple pseudo-assembly language program that has a tight loop.

Referring to FIG. 2a, a short program written in a pseudoassembly language is listed. The program in FIG. 2a comprises a very short loop. The first line of the program consists of a load instruction that loads a first register (R1) with the absolute value 3. The second line of the program contains an add instruction that adds the value of the first register (R1) to a second register (R2). The first register (R1) is then decremented in the third line of the program. In the fourth line of the program, the program branches back to the second line of the program if the zero flag has not been set. Thus if the first register (R1) does not yet contain the value 0, the program will loop back to the second line. Finally, in the fifth line of the program, the value in the second register (R2) is stored to memory.

Since the absolute value of 3 is loaded into first register (R1), the "branch if not zero" instruction located after the decrement R1 instruction will twice loop back to the second line. Upon the third pass of the loop, however, the first register (R1) will be decremented to zero. Therefore, the third time the program reaches the "branch if not zero"

instruction, the program will fall through to the fifth line of the program which stores the second register into memory. Thus the branch instruction in the fourth line will produce a branch history of taken, taken, not-taken (TTN). If this program is re-executed, since the first register (R1) is always loaded with the absolute value 3, this branch will always repeat this pattern thereby generating a branch history of "TTNTTNTTNTTN . . . " for the branch instruction located in the fourth line of the program.

An accurate branch prediction mechanism can identify this repeating branch pattern and use the repeating branch pattern to make future branch predictions. For example an ideal implementation of the two-level adaptive branch prediction mechanism disclosed by Yeh & Patt would identify this pattern and then always correctly predict the outcome of future occurrences of the branch instruction. However, problems can occur when the branch prediction mechanism is implemented in a real processor with a deep pipeline.

Figure 2B:
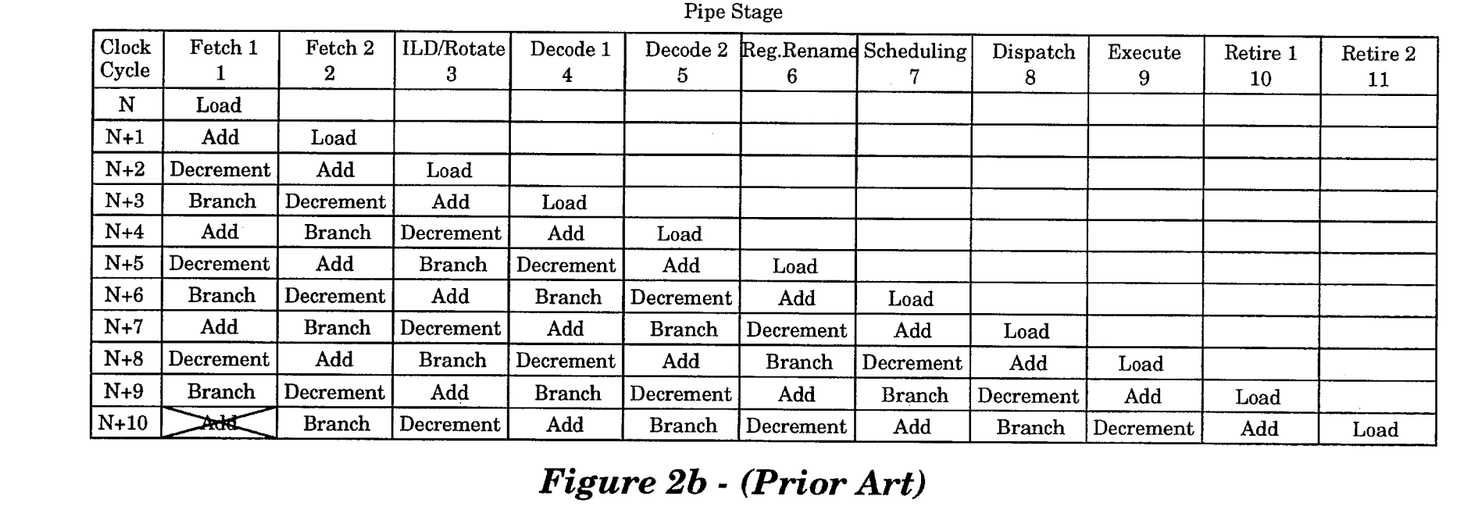
FIG. 2b is a trace of the instructions in the program in FIG. 2a going through the deep instruction pipeline illustrated in FIG. 1 for a system that fetches one instruction at a time and does not use speculative history.

FIG. 2b illustrates the contents of the instruction pipeline stages for the instruction pipeline of FIG. 1 as the instructions in the program in FIG. 2a flow through the processor. The instruction flow illustrated in FIG. 2b assumes that instructions are fetched one-by-one and that there are no pipeline stalls. Furthermore, the instruction flow assumes that the branch prediction mechanism has built a "TTNTT-NTTN . . . " branch history for the branch instruction in the fourth line of the program wherein T represents taken, N represents not-taken, and the rightmost letter represents the outcome of most recent occurrence of the branch instruction.

In first clock cycle illustrated in FIG. 2b, clock cycle N, the load instruction is first fetched. At clock cycle N+1, the load instruction moves to the fetch substage 2 and the first fetch substage fetches the Add instruction from the second line of the program. The processor proceeds to sequentially load instructions from memory into the instruction pipeline until the end of clock cycle N+3.

At the end of clock cycle N+3 the first fetch substage must make a branch prediction to load the next instruction. Since the branch history pattern for the branch contains "TTNTT-NTTN . . . ", the fetch substage predicts (correctly) that branch will be taken. So at clock cycle N+4 the instruction fetch unit goes back to the second line of the program and fetches the Add instruction. Again, the processor proceeds to sequentially fetch instructions from memory into the instruction pipeline until the end of clock cycle N+6.

At the end of clock cycle N+6 the first fetch substage must again predict the outcome of the branch instruction in order to fetch subsequent instructions. At the end of clock cycle N+6, the first occurrence of the branch instruction has reached the fourth pipestage, decode 1. Thus the first occurrence of the branch instruction has not yet been fully resolved. This means that the branch history still contains "TTNTTNTTN . . . ", since the branch history can not be updated until the branch instruction is fully resolved. Using the outdated history "TTNTTNTTN . . . ", the fetch substage again predicts (correctly) that branch will be taken. This amounts to a lucky guess since the branch prediction mechanism was actually predicting the first taken branch after the non-taken branch in the repeating pattern. So at clock cycle N+7 the instruction fetch unit again goes back to the second line to fetch the Add instruction. Once again, the processor then proceeds to sequentially fetch instructions from memory into the instruction pipeline until the end of clock cycle N+9.

At the end of clock cycle N+9 the first fetch substage must once again predict the outcome of the branch instruction in order to fetch subsequent instructions. At the end of clock cycle N+9, the first occurrence of the branch instruction has reached the seventh pipestage (scheduling) and the second occurrence of the branch instruction has reached the fourth pipestage (decode 1 ). Thus at the end of clock cycle N+9, neither the first occurrence nor the second occurrence of the branch instruction has been fully resolved. This means that the branch history still contains "TTNTTNTTN . . . ". Therefore, the branch prediction mechanism will again predict that branch will be taken. However, this time its luck has run out since this prediction will eventually prove to be incorrect. At clock cycle N+10 the instruction fetch unit yet again goes back to the second line to fetch the Add instruction. When the processor eventually detects the misprediction, the Add instruction and all subsequent instructions will need to be flushed from the pipeline.

The problem that occurred in the previous example was that the loop in the program was so small that the branch history was not updated fast enough. Therefore, the branch prediction mechanism could not "keep in sync" with the repeating branch pattern. Specifically, the outcome of earlier branches could not be used since the earlier branches were still in the instruction pipeline at stages where the branch instruction was not yet fully resolved. Thus in order to more accurately predict the outcome of the branch instruction, the history of previous occurrences of the branch instruction that are still in the pipeline must be made immediately available. However, it is impossible to provide a "real" branch history for branch instructions still in the midst of a deeply pipelined processor since the outcome of the branch instructions have not been fully resolved.

In order to overcome this problem, the present invention stores a "speculative history" for each branch by assuming that each branch prediction that is made is correct. If the branch prediction accuracy rate is high enough, this technique improves the branch prediction accuracy rate for branches in small loops within a deeply pipelined processor.

The Branch Target Buffer with Speculative History Fields

Figure 3:
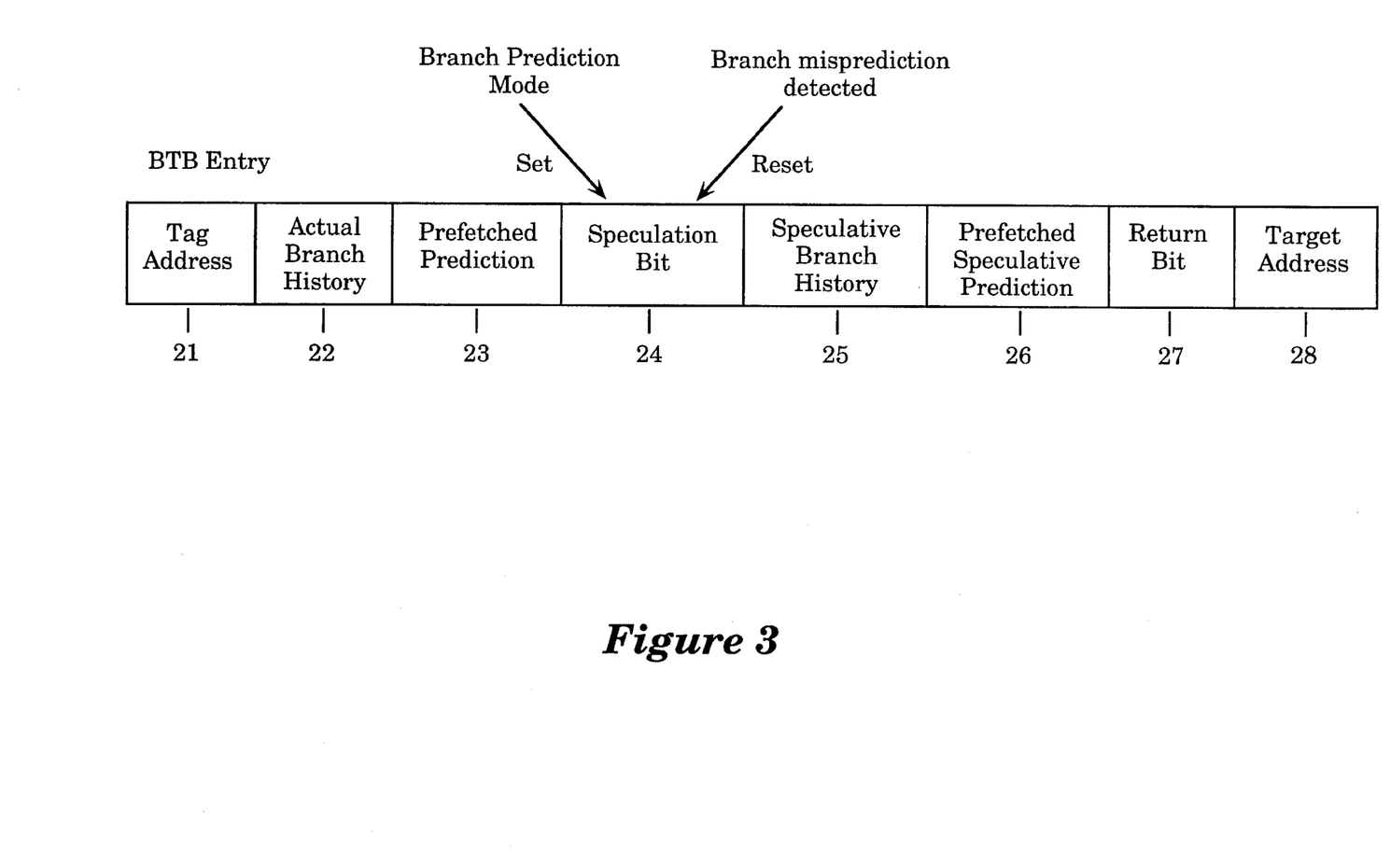
FIG. 3 is a block diagram of a branch target buffer entry for a branch prediction mechanism that uses speculative history.

FIG. 3 illustrates a branch target buffer entry for a branch prediction mechanism that stores speculative history. The first three fields in the branch target buffer entry of FIG. 3 store information about the branch instruction used by the branch prediction mechanism. The first field of the branch target buffer entry is the tag address field 21. The tag address field 21 stores an address that identifies where the branch instruction is in memory. The actual history field 22 stores the branch history for all fully resolved occurrences of this particular branch. The Precalculated Prediction field 23 stores a branch prediction for the next occurrence of the branch based upon the branch history information stored in the Actual History field 22. The Precalculated Prediction field 23 in FIG. 3 is an actual taken or not-taken branch prediction based upon the actual branch history field 22. The Precalculated Prediction field 23 is calculated whenever the actual history field is updated in order to reduce the time required to make a branch prediction from 2 cycles to 1 cycle.

The next three fields in the branch target buffer entry of FIG. 3 contain information required to maintain and use speculative history for each branch in the branch target buffer. The Speculation Bit 24 is set when the branch prediction mechanism of the present invention makes a branch prediction using this particular branch target buffer entry. Whenever a branch prediction is made, the branch prediction mechanism also updates the Speculative History field 25 and the Precalculated Speculative Prediction field 26. The Speculative History field 25 is updated to include the result of the branch prediction. The Precalculated Speculative Prediction 26 stores a branch prediction for the next occurrence of the branch based upon the speculative branch history stored in the Speculative History field 25.

The remaining fields in the branch target buffer entry of FIG. 3 store information commonly used in branch target buffers. The Return Bit field 27 is set when the branch instruction is a "return from subroutine" instruction. When the Return Bit field 27 is set, the branch prediction mechanism should pop a value off a return stack buffer (RSB) which specializes in predicting return addresses. The target address field 28 stores the address where the instruction fetch unit should fetch instructions from if the branch prediction mechanism predicts that the branch will be taken.

Updating the Speculative History Fields in the Branch Target Buffer

Figure 4:
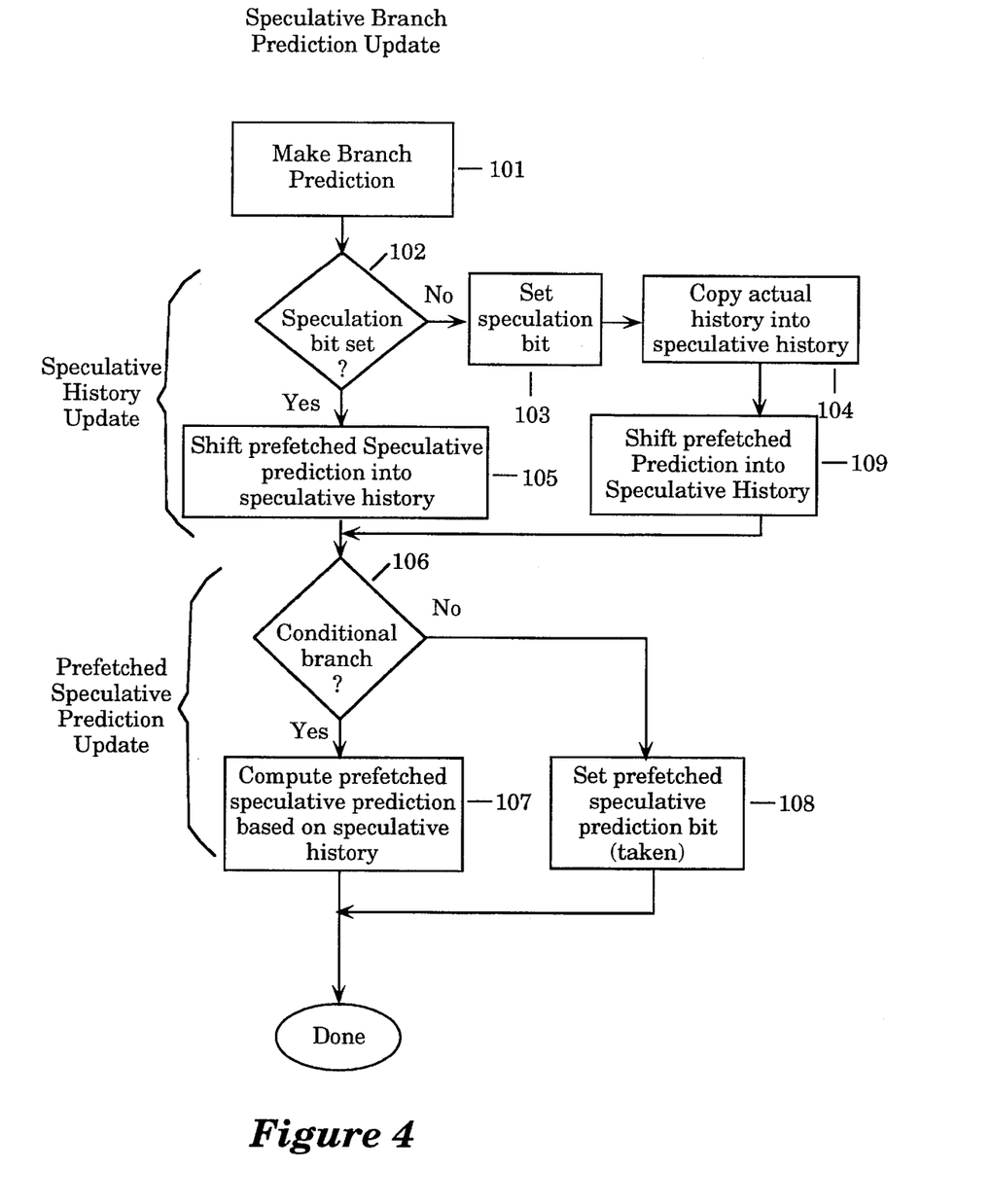
FIG. 4 is a flow diagram that lists the steps required to update the speculative history fields in the branch target buffer when a branch prediction is made.

FIG. 4 illustrates the method of updating the speculative history fields in the branch target buffer of the present invention. The process of updating the speculative history fields begins whenever the branch prediction mechanism makes a branch prediction that is based upon the branch's history as indicated by step 101 in FIG. 4. Any type of branch prediction mechanism that is based upon the branch history can be used in the present invention. Therefore, the exact details of the branch prediction process are not presented here. In the preferred embodiment, a variation on the Yeh & Patt Two-Level Adaptive Branch Prediction method is used. At step 102, the condition of the Speculation Bit 24 is tested to see if there is speculative history for the branch instruction.

If the Speculation Bit 24 is not set, this indicates that the information in the Speculative History field 25 is outdated, or has never been set. When the Speculation Bit 24 is not set, the method moves to step 103 which sets Speculation Bit 24 to indicate that the branch target buffer entry will now contain speculative history. Next, at step 104 the Actual History field 22 is copied into the Speculative History field 25 to provide a starting point for the Speculative History. Finally, at step 104 the Precalculated Prediction 23 is shifted into the Speculative History field 25 thereby providing the first bit of "Speculative History" since it is only a prediction that may eventually turn out to be wrong.

Referring back to step 102, if the Speculation Bit 24 is set, this indicates that earlier branch predictions have been made for this branch target buffer entry and that the Speculative History field 25 contains the history of those earlier predictions. Therefore, when the Speculation Bit 24 is set, the update process moves to step 105 which shifts the Precalculated Speculative Prediction Bit 26 into the Speculative History field 25 thereby adding another bit of "Speculative History" to the Speculative History field 25.

After updating the Speculative History field 25, the Precalculated Speculative Prediction Bit 26 should be recalculated using the new speculative history in the Speculative History field 25. At step 106, the system checks if the branch is a conditional branch or an unconditional branch. If the branch is unconditional then the Speculative Precalculated Prediction bit 26 is set at step 108 since the branch is always taken. If the branch is unconditional then the branch prediction mechanism calculates a prediction for the branch based upon the newly updated Speculative History field 25. The new branch prediction is then placed into the Speculative Precalculated Prediction bit field 26 as stated in step 107.

Updating the Actual History Fields in the Branch Target Buffer

After making a branch prediction, the branch instruction continues along the instruction pipeline. Near the end of the instruction pipeline, the branch instruction for which a prediction was made eventual becomes fully resolved. When the branch instruction is fully resolved the branch prediction is verified against the result of the actual resolved branch instruction.

If the branch prediction was correct, then the processor continues normally. However, if the branch prediction was wrong, then the processor must clear out every instruction in the instruction pipeline located after the mispredicted branch since the instruction fetch unit should not have loaded these instructions.

Furthermore, if a branch is mispredicted, then the speculative history is the branch target buffer is wrong. Therefore, the speculative history for the branch should not be used to make any additional branch predictions. To prevent any more predictions after a misprediction is detected, the Speculation bit 24 in the branch target buffer is cleared as illustrated in FIG. 3.

Figure 5:
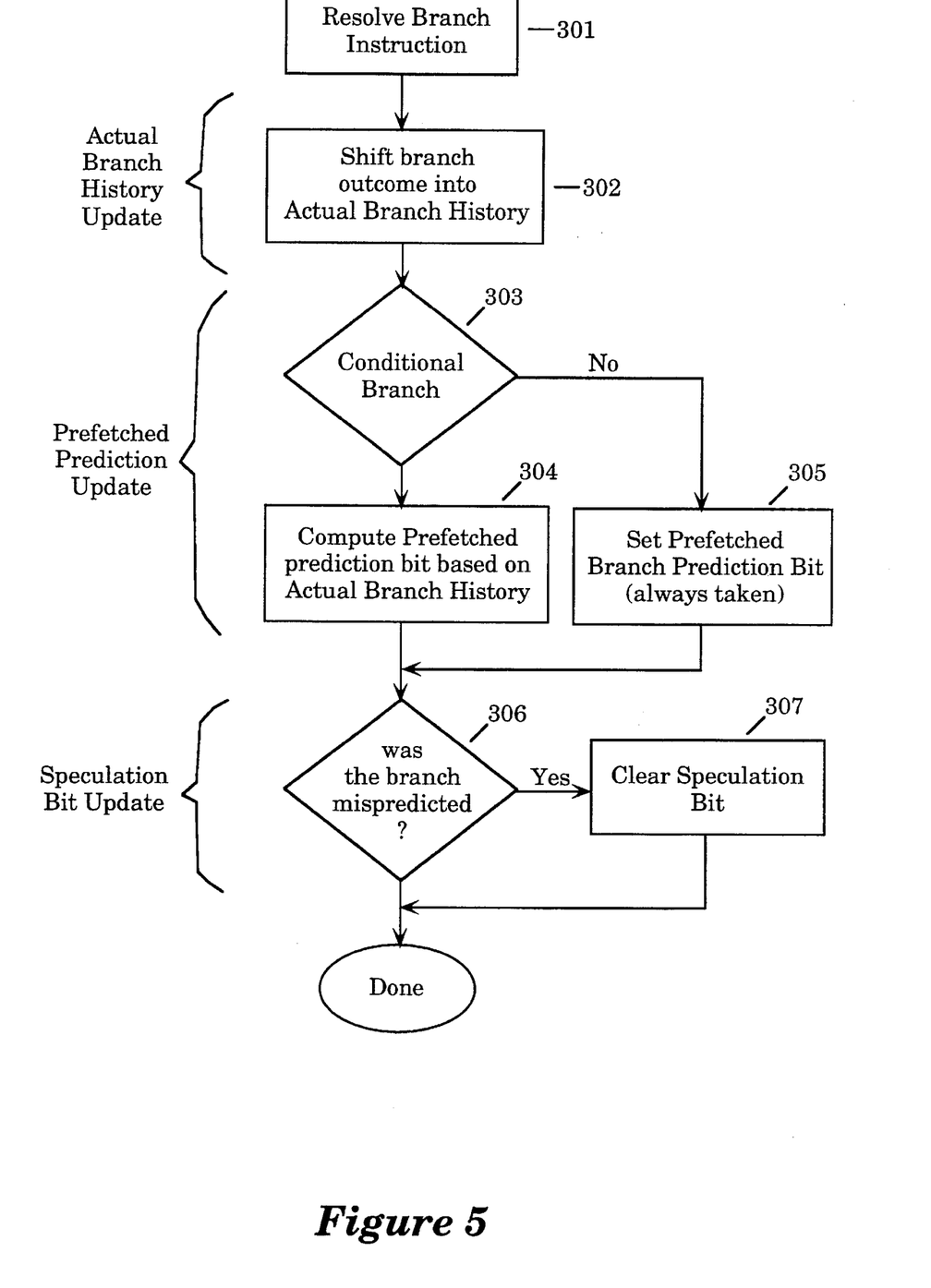
FIG. 5 is a flow diagram that lists the steps required to update the appropriate fields in the branch target buffer when a branch becomes fully resolved by the processor.

FIG. 5 illustrates the steps performed when a branch instruction eventually becomes fully resolved. At step 301 in FIG. 5, the branch instruction becomes fully resolved thereby providing a final taken or not-taken branch outcome. Then, at step 302, the resolved branch outcome is shifted into the actual history field 22. At step 303, the type of branch is examined. If the branch is unconditional, then the prefetched prediction bit 23 is set as stated in step 305. If the branch is unconditional, then the branch prediction mechanism calculates a branch prediction using the actual history in the actual history field 22 and places the prediction in the prefetched prediction bit 23 as stated in step 304. Finally, at step 306, the branch prediction made for the branch is compared with the actual resolved branch outcome. If the branch prediction was correct, the update is complete and the processor continues along normally. However if the prediction was incorrect, the speculation bit 24 is cleared to prevent any further predictions using the incorrect speculative history in the speculative history field 25.

Making Predictions Based Upon the Speculative History Fields

Figure 6:
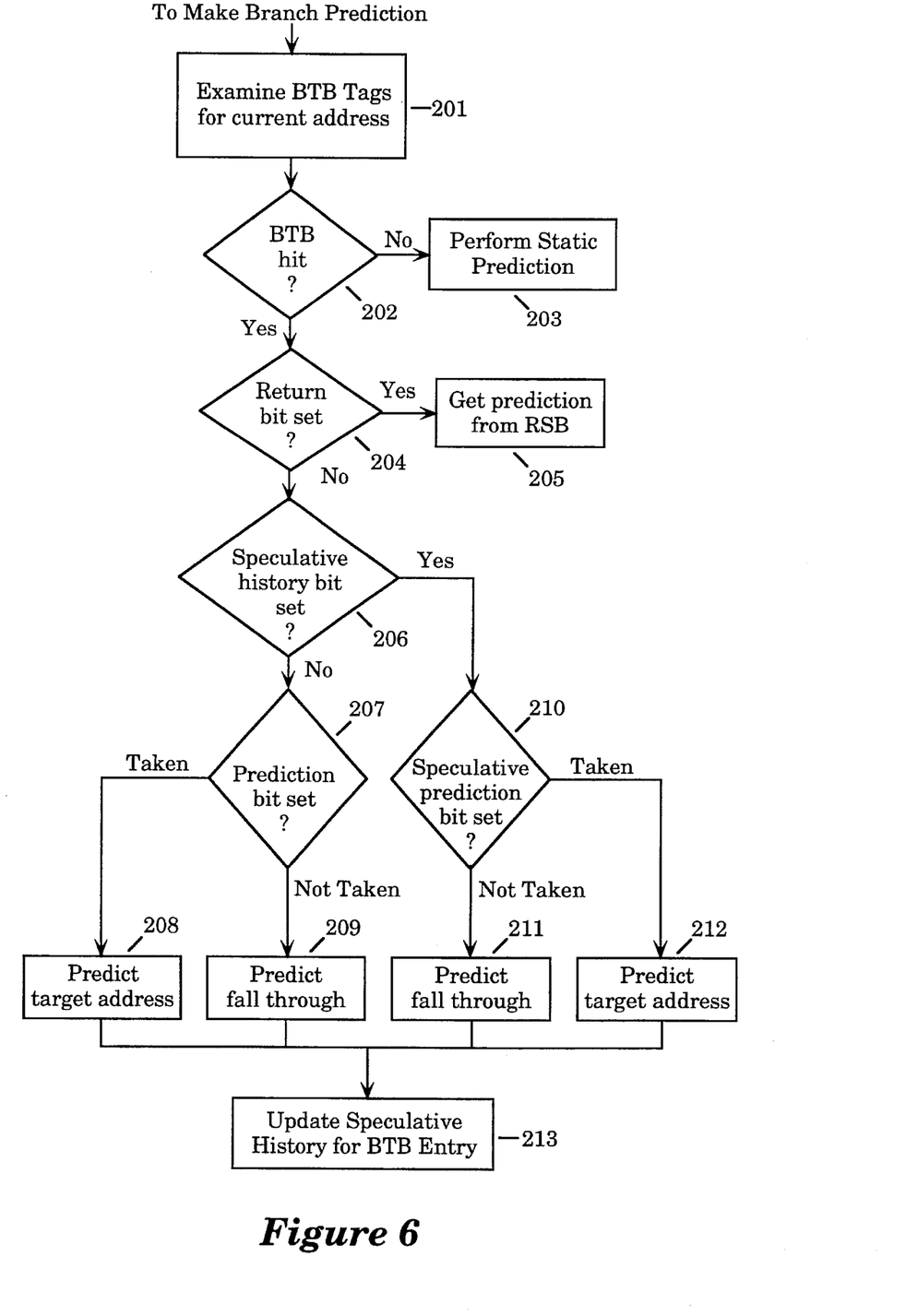
FIG. 6 is a flow diagram that lists the steps required to make a branch prediction based upon the speculative history fields in the branch target buffer.

FIG. 6 illustrates how a branch prediction mechanism based upon a branch target buffer with speculative history fields uses the speculative history information to make predictions. The first step, step 201, is to search the branch target buffer to see if there is a branch target buffer entry. If there is no branch target buffer entry then the branch target buffer can not be used to make a branch prediction. Therefore the branch prediction mechanism must make a static branch prediction as stated in step 203.

If there is a branch target buffer hit, the branch prediction mechanism then checks the condition of the return bit 27 in the appropriate branch target buffer entry at step 204. If the return bit 27 is set, indicating that the branch is a "return from subroutine" instruction, then the branch prediction mechanism obtains a prediction from the return stack buffer that specializes in predicting return addresses as stated in step 205.

If the return bit 27 is not set, the branch prediction mechanism then checks the condition of the Speculation bit 24 in the branch target buffer entry at step 206. This test determines whether the branch prediction mechanism should use the Precalculated Speculative Prediction 26 or the normal Precalculated Prediction 23.

If the Speculation bit 24 is set, then the Precalculated Speculative Prediction bit 26 is used to select a branch prediction as shown at step 210. If the Precalculated Speculative Prediction bit 26 is set, the branch prediction mechanism will predict a jump to the target address as shown in step 212; else the branch prediction mechanism predicts a fall-through at step 211.

If the Speculation bit 24 is not set, then the normal Speculative Prediction bit 23 is used to select a branch prediction as shown at step 207. If the Speculative Prediction bit 23 is set, the branch prediction mechanism will predict a jump to the target address as shown in step 208; else the branch prediction mechanism predicts a fall-through at step 209.

After making the branch prediction, the instruction fetch unit fetches instructions along the predicted instruction stream. The branch prediction mechanism also uses the new branch prediction to update the speculative history fields as stated in step 213.

Figure 7:
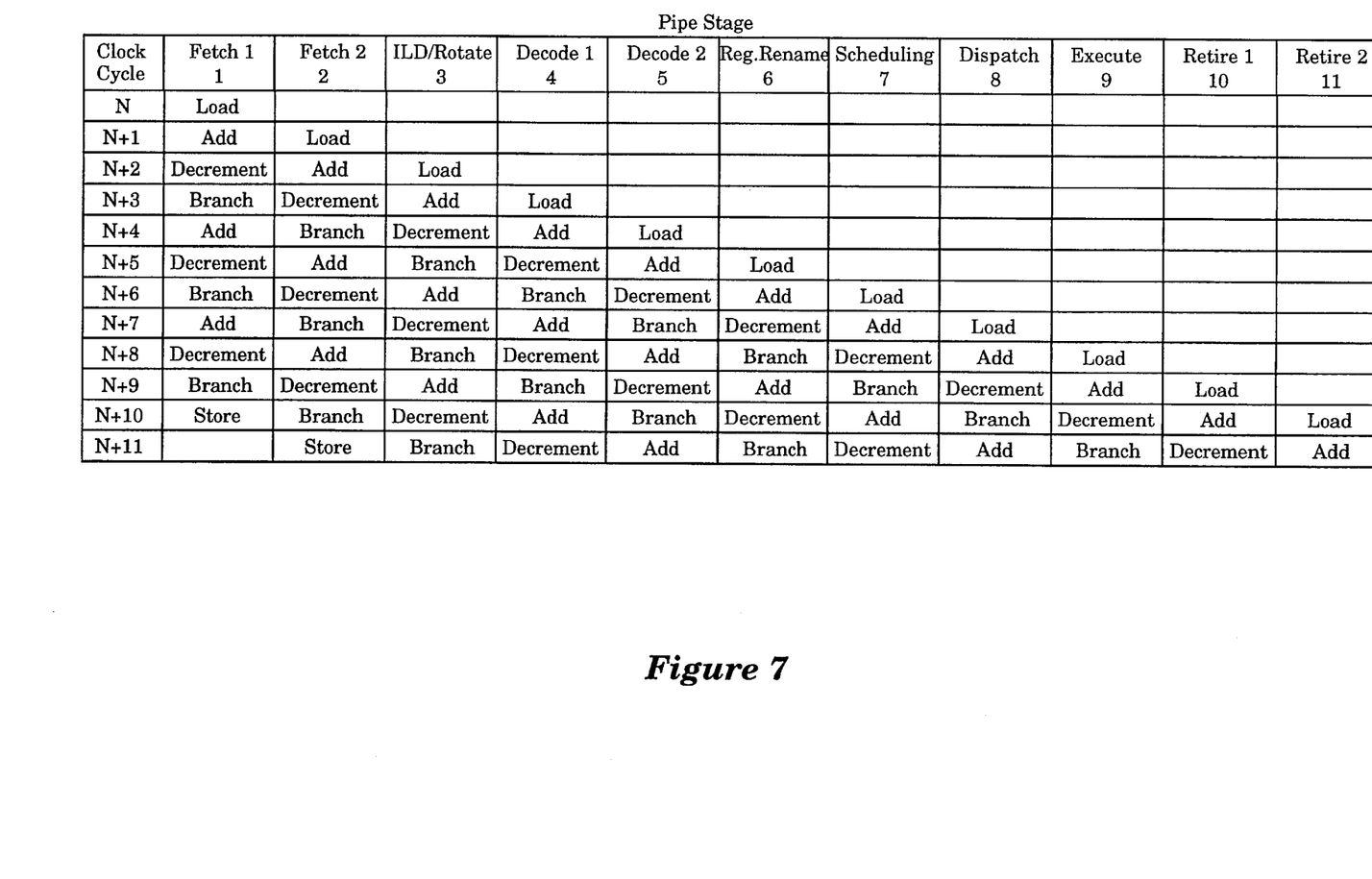
FIG. 7 is a trace of the instructions in the program in FIG. 2a going through the deep instruction pipeline illustrated in FIG. 1 for a system that makes predictions based on speculative history.

FIG. 7 illustrates the contents of the instruction pipeline stages for the instruction pipeline of FIG. 1 when the program in FIG. 2a is run in a processor that uses speculative history. The instruction flow illustrated in FIG. 7 assumes that instructions are fetched one-by-one, that there are no pipeline stalls, and that the branch prediction mechanism has built a "TTNTTNTTN . . . " branch history for the branch instruction in the fifth line of the program.

For the first 4 clock cycles (N through N+3), the processor sequentially loads instructions into the instruction pipeline as illustrated in FIG. 7. At the end of clock cycle N+3, however, the first fetch substage must make a branch prediction to load the next instruction. Since the branch history pattern for the branch contains "TTNTTNTTN . . . ", the fetch substage predicts (correctly) that branch will be taken. At this time, the Speculation bit for the branch entry will be set and the "branch taken" prediction will be shifted into the speculative history. Thus the speculative history will contain "TTNTTNTTNT . . . ". Since the branch prediction mechanism predicted the branch to be taken, the instruction fetch unit goes back to the second line of the program at clock cycle N+4 and fetches the Add instruction. The processor then proceeds to sequentially fetch instructions from memory into the instruction pipeline until the end of clock cycle N+6.

At the end of clock cycle N+6 the first fetch substage must again predict the outcome of the branch instruction in order to fetch subsequent instructions. At the end of clock cycle N+6, the first occurrence of the branch instruction has reached the fourth pipestage, decode 1. Thus the first occurrence of the branch instruction has not yet been fully resolved and therefore the branch history has not been updated. However, the speculative history was updated using the predicted branch such that the speculative branch history now contains "TFNTTNTTNT . . . ". Since the speculation bit is set, the branch prediction mechanism in the fetch substage uses the "TTNTTNTTNT . . . " speculative history to predict (correctly) that branch will be taken. So at clock cycle N+7 the instruction fetch unit again goes back to the second line to fetch the Add instruction. Then the processor proceeds to sequentially fetch instructions from memory into the instruction pipeline until the end of clock cycle N+9.

At the end of clock cycle N+9, the first fetch substage must once again predict the outcome of the branch instruction in order to fetch subsequent instructions. At the end of clock cycle N+9, the first occurrence of the branch instruction has reached the seventh pipestage (scheduling) and the second occurrence of the branch instruction has reached the fourth pipestage (decode 1). Thus at the end of clock cycle N+9, neither the first nor the second occurrence of the branch instruction has been fully resolved. This means that the branch history still contains "TTNTTNTTN . . . ". However, the speculative branch history contains "TTNTTNTTNTT . . . ". Since the speculation bit is set, the branch prediction mechanism will predict (correctly) that the branch should not be taken. So at clock cycle N+10 the instruction fetch unit fetches the Store instruction after the branch instruction. As can be seen in the instruction trace of FIG. 7, the branch prediction mechanism of the present invention that uses speculative history will correctly predict the outcome of branches in tight loops.

Figure 8:
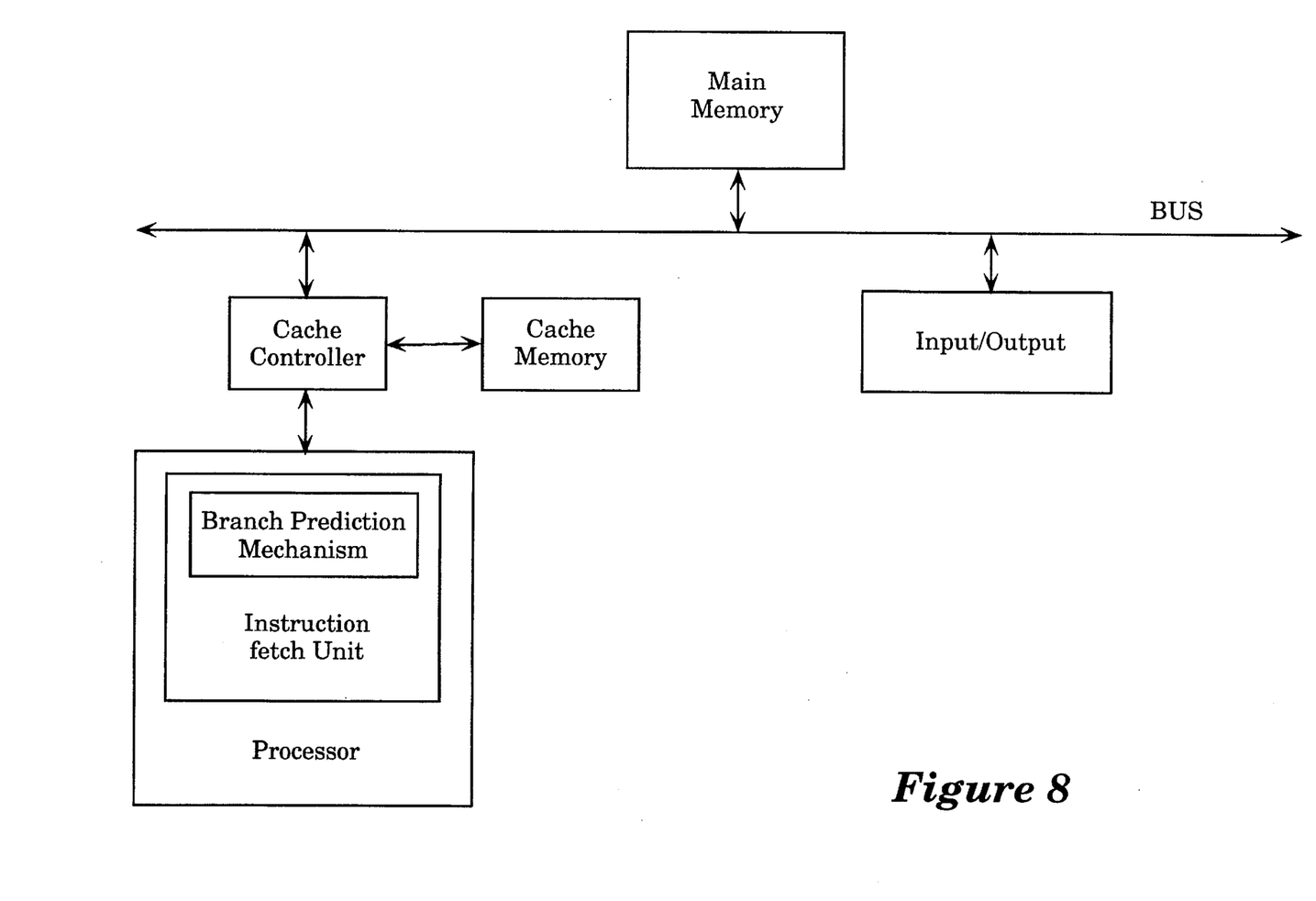
FIG. 8 is a block diagram of a computer system using the teachings of the present invention.

FIG. 8 illustrates the present invention as used in a typical computer system. The present invention comprises a branch prediction apparatus located within a processor. The branch prediction apparatus is used to fetch the proper instructions for the processor from the cache memory or the main memory.

The foregoing has described a branch prediction mechanism with a branch target buffer that stores speculative history. The speculative history improves the accuracy of branch predictions for small loops executing in processors with deep pipelines. It is contemplated that changes and modifications may be made by one of ordinary skill in the art, to the materials and arrangements of elements of the present invention without departing from the scope of the invention.

We claim:

1. In a computer processor, said computer processor coupled to a memory, a branch prediction apparatus for predicting a stream of processor instructions to fetch, said branch prediction apparatus comprising the elements of:

a branch target buffer comprising N branch prediction entries, each of said N branch prediction entries having an associated branch instruction in said stream of processor instructions, each of said N branch prediction entries comprising an actual branch history field, said actual branch history field storing a final resolved branch outcome of a last K occurrences of said associated branch instruction;

a speculation bit, said branch prediction apparatus setting said speculation bit when said branch prediction apparatus makes a branch prediction for said associated branch instruction;

a speculative branch history field, said branch speculative history field storing K bits of speculative branch history comprising branch predictions of recent occurrences of said associated branch instruction;

a target address field, said target address field comprising a target address identifying where said computer processor should fetch from when said associated branch instruction is predicted taken; and a dynamic branch prediction circuit, said dynamic branch prediction circuit using said actual branch history to make a branch prediction when said speculation bit is clear, else said dynamic branch prediction circuit using said speculative branch history to make a branch prediction when said speculation bit is set.

2. The branch prediction apparatus as claimed in claim 1, wherein said speculation bit in a branch prediction entry is reset when said dynamic branch prediction circuit mispredicts said associated branch instruction.

3. The branch prediction apparatus as claimed in claim 2, wherein said speculative branch history field in each branch prediction entry is updated when a branch prediction is made for said associated branch instruction.

4. The branch prediction apparatus as claimed in claim 3, wherein each branch prediction entry in said branch target buffer further comprises a precalculated branch prediction, said precalculated branch prediction comprising a branch prediction made by said dynamic branch prediction circuit based on said actual branch history field; and a precalculated speculative branch prediction, said precalculated speculative branch prediction comprising a branch prediction made by said dynamic branch prediction circuit based on said speculative branch history field.

5. The branch prediction apparatus as claimed in claim 4, wherein said dynamic branch prediction circuit updates said speculative branch history field using said precalculated branch prediction if said speculation bit is reset; else said dynamic branch prediction circuit updates said speculative branch history field using said precalculated speculative branch prediction if said speculation bit is set.

6. The branch prediction apparatus as claimed in claim 5, wherein said dynamic branch prediction circuit updates said actual branch history field in said branch prediction entry using an actual branch outcome when said associated branch instruction is fully resolved by a branch execution unit.

7. The branch prediction apparatus as claimed in claim 6, wherein said dynamic branch prediction circuit implements a variation of an adaptive two-level branch prediction mechanism.

8. The branch prediction apparatus as claimed in claim 7, wherein each branch prediction entry in said branch target buffer further comprises a return bit that identifies if said associated branch instruction is a return instruction, said branch prediction apparatus using a prediction from a return stack buffer if said return bit is set.

9. The branch prediction apparatus as claimed in claim 8, wherein said branch prediction apparatus further comprises a static branch prediction circuit such that if no branch target buffer entry for a particular branch instruction exists then said static branch prediction circuit is used to make a branch prediction for said particular branch instruction.

10. The branch prediction apparatus as claimed in claim 9, wherein said branch prediction apparatus is implemented in a processor with a deep instruction pipeline.

11. In a computer processor, said computer processor coupled to a memory, a branch prediction apparatus for predicting a stream of processor instructions to fetch, said branch prediction apparatus comprising the elements of:

branch target buffer means comprising N branch prediction entries, each of said N branch prediction entries having an associated branch instruction in said stream of processor instructions, each of said N branch prediction entries comprising actual branch history means, said actual branch history means storing a final resolved branch outcome of a last K occurrences of said associated branch instruction;

speculation bit means, said branch prediction apparatus setting said speculation bit means when said branch prediction apparatus setting makes a branch prediction for said associated branch instruction;

speculative branch history means, said branch speculative history means storing K bits of speculative branch history comprising branch predictions of recent occurrences of said associated branch instruction;

target address means, said target address means identifying where said computer processor should fetch from when said associated branch instruction is predicted taken; and dynamic branch prediction means, said dynamic branch prediction means using said actual branch history means to make a branch prediction when said speculation bit is clear, else said dynamic branch prediction means using said speculative branch history means to make a branch prediction when said speculation bit is set.

12. The branch prediction apparatus as claimed in claim 11, wherein said speculation bit means in a branch prediction entry is reset when said dynamic branch prediction means mispredicts said associated branch instruction.

13. The branch prediction apparatus as claimed in claim 12, wherein said speculative branch history means in each branch prediction entry is updated when a prediction is made for said associated branch instruction.

14. The branch prediction apparatus as claimed in claim 13, wherein each branch prediction entry in said branch target buffer means further comprises precalculated branch prediction means, said precalculated branch prediction means comprising a branch prediction made by said dynamic branch prediction circuit based on said actual branch history means; and precalculated speculative branch prediction means, said precalculated speculative branch prediction means comprising a branch prediction made by said dynamic branch prediction circuit based on said speculative branch history means.

15. The branch prediction apparatus as claimed in claim 14, wherein said dynamic branch prediction means updates said speculative branch history means using said precalculated branch prediction means if said speculation bit means is reset; else said dynamic branch prediction means updates said speculative branch history means using said precalculated speculative branch prediction means if said speculation bit means is set.

16. The branch prediction apparatus as claimed in claim 15, wherein said dynamic branch prediction means updates said actual branch history means in said branch prediction entry using an actual branch outcome when said associated branch instruction is fully resolved by a branch execution unit.

17. The branch prediction apparatus as claimed in claim 16, wherein said dynamic branch prediction means comprises a variation of an adaptive two-level branch prediction mechanism.

18. The branch prediction apparatus as claimed in claim 17, wherein each branch prediction entry in said branch target buffer further comprises a return bit means that identifies if said associated branch instruction is a return instruction, said branch prediction apparatus using a prediction from a return stack buffer if said return bit means is set.

19. The branch prediction apparatus as claimed in claim 18, wherein said branch prediction apparatus further comprises a static branch prediction means such that if no branch target buffer entry for a particular branch instruction exists then said static branch prediction means is used to make a branch prediction for said particular branch instruction.

20. The branch prediction apparatus as claimed in claim 19, wherein said branch prediction apparatus is implemented in a processor with a deep instruction pipeline.

21. A computer system, said computer system comprising the elements of:
   a system bus;
   a main memory, said main memory coupled to said system bus;
   a computer processor, said computer processor having a branch target buffer for predicting a stream of processor instructions to fetch, said branch target buffer comprising N branch prediction entries, each of said N branch prediction entries having an associated branch instruction in said stream of processor instructions, each of said N branch prediction entries comprising
      an actual branch history field, said actual branch history field storing a final resolved branch outcome of a last K occurrences of said associated branch instruction;
      a speculation bit, said speculation bit set when predictions have been made for said associated branch instruction;
      a speculative branch history field, said branch speculative history storing K bits of speculative branch history comprising branch predictions of recent occurrences of said associated branch instruction;
      a target address, said target address identifying where said computer processor should fetch from when said associated branch instruction is predicted taken; and
   a dynamic branch prediction circuit within said computer processor, said dynamic branch prediction circuit using said actual branch history field to make a branch prediction when said speculation bit is clear, else said dynamic branch prediction circuit using said speculative branch history field to make a branch prediction when said speculation bit is set.

22. The computer system as claimed in claim 21, wherein said speculation bit in a branch prediction entry is updated when said dynamic branch prediction circuit mispredicts said associated branch instruction.

23. The computer system as claimed in claim 22, wherein said speculative branch history field in each branch prediction entry is reset when a prediction is made for said associated branch instruction.

24. The computer system as claimed in claim 23, wherein each branch prediction entry in said branch target buffer further comprises
   a precalculated branch prediction, said precalculated branch prediction comprising a branch prediction made by said dynamic branch prediction circuit based on said actual branch history field; and
   a precalculated speculative branch prediction, said precalculated speculative branch prediction comprising a branch prediction made by said dynamic branch prediction circuit based on said speculative branch history field.

25. The computer system as claimed in claim 24, wherein said dynamic branch prediction circuit updates said speculative branch history field using said precalculated branch prediction if said speculation bit is reset; else said dynamic branch prediction circuit updates said speculative branch history field using said precalculated speculative branch prediction if said speculation bit is set.

26. The computer system as claimed in claim 25, wherein said dynamic branch prediction circuit updates said actual branch history field in said branch prediction entry using an actual branch outcome when said associated branch instruction is fully resolved by a branch execution unit.

27. The computer system as claimed in claim 26, wherein said dynamic branch prediction circuit comprises a variation of an adaptive two-level branch prediction mechanism.

28. The computer system as claimed in claim 27, wherein each branch prediction entry in said branch target buffer further comprises a return bit that identifies if said associated branch instruction is a return instruction, said processor using a prediction from a return stack buffer if said return bit is set.

29. The computer system as claimed in claim 28, wherein said branch prediction apparatus further comprises a static branch prediction circuit such that if no branch target buffer entry for a particular branch instruction exists then said static branch prediction mechanism is used to make a branch prediction for said particular branch instruction.

30. The computer system as claimed in claim 29, wherein said processor comprises a deep instruction pipeline.

31. A computer system, said computer system comprising the elements of:
   a system bus;
   a main memory, said main memory coupled to said system bus;
   a computer processor, said computer processor having a branch target buffer means comprising N branch prediction entries, each of said N branch prediction entries having an associated branch instruction in said stream of processor instructions, each of said N branch prediction entries comprising
      actual branch history means, said actual branch history means storing a final resolved branch outcome of a last K occurrences of said associated branch instruction;
      speculation bit means, said speculation bit means set when predictions have been made for said associated branch instruction;
      speculative branch history means, said branch speculative history means storing K bits of speculative branch history comprising branch predictions of recent occurrences of said associated branch instruction;
      target address means, said target address means identifying where said computer processor should fetch from when said associated branch instruction is taken; and
   dynamic branch prediction means within said processor, said dynamic branch prediction means using said actual branch history means to make a branch prediction when said speculation bit is clear, else said dynamic branch prediction means using said speculative branch history means to make a branch prediction when said speculation bit is set.

32. The computer system as claimed in claim 31, wherein said speculation bit means in a branch prediction entry is reset when said dynamic branch prediction means mispredicts said associated branch instruction.

33. The computer system as claimed in claim 32, wherein said speculative branch history means in each branch prediction entry is updated when a prediction is made for said associated branch instruction.

34. The computer system as claimed in claim 33, wherein each branch prediction entry in said branch target buffer means further comprises
   precalculated branch prediction means, said precalculated branch prediction means comprising a branch prediction made by said dynamic branch prediction means based on said actual branch history means; and precalculated speculative branch prediction means, said precalculated speculative branch prediction means comprising a branch prediction made by said dynamic branch prediction means based on said speculative branch history means.

35. The computer system as claimed in claim 34, wherein said speculative branch history means is updated using said precalculated branch prediction means if said speculation bit means is reset; else said speculative branch history means is updated using said precalculated speculative branch prediction means if said speculation bit means is set.

36. The computer system as claimed in claim 35, wherein said dynamic branch prediction means updates said actual branch history means in said branch prediction entry using an actual branch outcome when said associated branch instruction is fully resolved by a branch execution unit.

37. The computer system as claimed in claim 36, wherein said dynamic branch prediction means comprises a variation of an adaptive two-level branch prediction mechanism.

38. The computer system as claimed in claim 37, wherein each branch prediction entry in said branch target buffer further comprises a return bit means that identifies if said associated branch instruction is a return instruction, said processor using a prediction from a return stack buffer if said return bit means is set.

39. The computer system as claimed in claim 38, wherein said processor further comprises a static branch prediction means such that if said processor cannot find an appropriate target buffer entry then said static branch prediction means is used to make a branch prediction.

40. The branch prediction apparatus as claimed in claim 39, wherein said processor comprises a deep instruction pipeline.

41. In a computer processor having a branch target buffer comprising N branch prediction entries, said computer processor coupled to a memory, a method for predicting a stream of processor instructions to fetch, said method comprising the steps of:

storing a branch target address in one of said branch prediction entries in said branch target buffer, each of said N branch prediction entries having an associated branch instruction;

storing an actual branch history in each of said branch prediction entries in the branch target buffer, said actual branch history comprising the fully resolved branch outcome for K most recent occurrences of said associated branch instruction;

storing a speculative branch history in each branch prediction entry in the branch target buffer, said speculative branch history comprising branch predictions of recent occurrences of said associated branch instruction;

storing a speculation bit in each branch prediction entry in the branch target buffer;

setting said speculation bit when a branch prediction circuit makes a branch prediction for said associated branch instruction;

predicting a branch instruction outcome using said actual branch history when said speculation bit is clear, else predicting a branch instruction outcome using said speculative branch history when said speculation bit is set.

42. The method for predicting a stream of processor instructions to fetch as claimed in claim 41, wherein said method further comprises the step of:

clearing said speculation bit when a branch prediction made for said associated branch instruction is incorrect.

* * * * *

UNITED STATES PATENT AND TRADEMARK OFFICE
CERTIFICATE OF CORRECTION

PATENT NO. : 5,584,001
DATED : December 10, 1996
INVENTOR(S) : Hoyt et al.

It is certified that error appears in the above-identified patent and that said Letters Patent is hereby corrected as shown below:

In column 9 at line 63 delete "TFNTTNTTNT" and insert --TTNTTNTTNT--

Signed and Sealed this

Twenty-fifth Day of February, 1997

Attest:

BRUCE LEHMAN

Attesting Officer

Commissioner of Patents and Trademarks